(12) United States Patent
Ginsberg et al.

(10) Patent No.: US 6,175,916 B1
(45) Date of Patent: Jan. 16, 2001

(54) COMMON-THREAD INTER-PROCESS FUNCTION CALLS INVOKED BY JUMPS TO INVALID ADDRESSES

(75) Inventors: Michael Ginsberg; Thomas Fenwick, both of Redmond, WA (US)

(73) Assignee: Microsoft Corporation, Redmond, WA (US)

( * ) Notice: Under 35 U.S.C. 154(b), the term of this patent shall be extended for 0 days.

(21) Appl. No.: 08/852,157

(22) Filed: May 6, 1997

(51) Int. Cl.[7] ............................................ G06F 9/46
(52) U.S. Cl. ...................... 712/228; 709/108; 711/203
(58) Field of Search .................................. 395/677, 678, 395/680, 569, 742; 711/147, 203; 712/228; 709/108

(56) References Cited

U.S. PATENT DOCUMENTS

| | | | |
|---|---|---|---|
| 4,366,537 | * 12/1982 | Heller et al. | 711/164 |
| 4,677,546 | * 6/1987 | Freeman et al. | 711/203 |
| 5,426,747 | * 6/1995 | Weinreb et al. | 711/203 |
| 5,515,538 | * 5/1996 | Kleiman | 710/260 |
| 5,644,755 | * 7/1997 | Wooten | 703/23 |

* cited by examiner

Primary Examiner—Kenneth S. Kim
(74) Attorney, Agent, or Firm—Lee & Hayes, PLLC (57) ABSTRACT

The invention includes a method of making a call from one process to another. The method includes executing a jump instruction from a first process, while specifying an invalid destination address such as an odd virtual memory address. The invalid address causes a memory fault, which in turn results in the invocation of a memory fault handler. The memory fault handler is configured to recognize certain specified invalid addresses, and to call different system functions depending on the particular values of the addresses. The thread of the calling process is used to execute both the fault handler and the called system functions.

62 Claims, 6 Drawing Sheets

COMMON-THREAD INTER-PROCESS FUNCTION CALLS INVOKED BY JUMPS TO INVALID ADDRESSES

TECHNICAL FIELD

This invention relates to operating systems and to methods of calling and executing system functions.

BACKGROUND OF THE INVENTION

Modern operating systems are capable of concurrently executing a plurality of different processes. Generally, an individual process is an executable program, defined by code and data. It has a private virtual address space, which is a set of virtual memory addresses that the process can use. In addition, a process has one or more execution threads.

Operating systems use virtual memory to isolate different processes from each other to a certain degree, and to thereby prevent one process from interfering with another. With virtual memory, a process is assigned its own, private virtual address space, which is generally not available to other processes. Through its virtual memory, a process has a logical view of memory that does not correspond to the actual layout of physical memory. Each time a process uses a virtual memory address, a virtual memory system translates it into a physical address using a virtual-to-physical address mapping contained in some type of look-up structure and address mapping database. The virtual-to-physical address mappings are unique for each address space. The virtual memory system prevents processes from directly accessing the virtual memory used by other processes or by the operating system.

As mentioned above, a process has one or more execution threads. Generally, an execution thread comprises a sequence of processor instructions that execute in a single processor context. The particular elements of a thread's context vary depending on the microprocessor being used. For purposes of the discussion herein, however, a thread's context always includes its private memory stack or stacks. Therefore, by definition, a single thread always uses the same private memory stack. Any time the processor context changes to a different memory stack, the processor is said to be executing a different thread. In many cases, a thread's context also includes the volatile contents of a set of processor registers.

A processor is capable of executing only one thread at a time. However, a multitasking operating system allows users to run multiple programs and processors, while appearing to execute all of them at the same time. It achieves this in the following way:

1. It runs a thread until the thread's execution is interrupted or until the thread must wait for a resource to become available.
2. It saves the thread's context.
3. It loads another thread's context.
4. It repeats this sequence as long as there are threads waiting to execute.

It is common for a computer processor and associated operating system to allow two different levels of resource availability. One level, referred to as a non-privileged mode or user mode, is used by application programs and other so-called "user" processes or programs. At this level, an execution thread is prevented by the operating system and by the computer processor from performing certain security-critical operations. The thread is also prevented from directly accessing many system resources. The purpose of the non-privileged execution mode is to isolate a user process as much as possible so that it cannot interfere with other user processes or with operating system functions. While a user process may itself crash, it should not be able to crash other programs or the operating system.

The other level of execution is referred to as privileged mode, system mode, or kernel mode. Critical operating system components are implemented in kernel mode—kernel-mode components are responsible for things like virtual memory management, responding to interrupts and exceptions, scheduling execution threads, synchronizing the activities of multiple processors, and other critical or sensitive functions. Such components, which execute from system mode, are generally referred to collectively as "the kernel." The kernel is responsible for supervising the virtual memory system in most computer systems.

A user-mode execution thread gains access to the operating system by calling system services or functions. However, a conventional program call or jump instruction to system code is not allowed because the operating system is located in a protected virtual address space that cannot be directly accessed by user-mode threads. Rather, the calling user-mode thread utilizes a special processor instruction, typically called a trap instruction. A trap instruction causes an automatic jump to a privileged-mode trap handler. One or more arguments are usually provided by the calling process, indicating which system function is desired. These arguments are passed in processor registers or on a memory stack. The trap handler suspends the calling thread and schedules a new thread for execution of the system function. When the system function has completed, the operating system reschedules the calling thread.

The Windows® NT operating system is an example of an operating system that implements multiple threads. The Windows® NT operating system is described in *Inside Windows NT*, by Helen Custer, published by Microsoft Press, 1993, which is hereby incorporated by reference. As described in this book at page 230, a trap instruction results in a switch to privileged-mode execution and a jump to the kernel. The kernel copies the caller's arguments from the thread's user-mode stack to another stack that is referred to as the thread's kernel-mode stack. The kernel then executes the system service. Thus, a context change is made (changing stacks) in response to a trap instruction; in accordance with the terminology adopted herein, a different thread (using a different stack) is initiated within the kernel and is used for executing the kernel itself and the called system function.

As noted above, arguments can be passed to a system function on the memory stack of the calling thread. In addition, it is desirable to be able to pass pointer arguments to a system function so that data can be specified by reference. Accordingly, the kernel and system functions must be able to access the virtual address spaces of calling processes.

Figure 1:
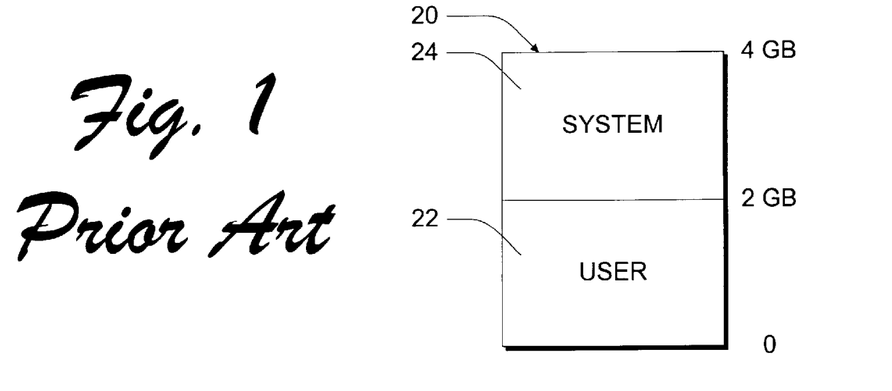
FIGS. 1 and 2 show virtual memory systems implemented by prior art operating systems.

In the Windows® NT operating system, this is accomplished as illustrated in FIG. 1. The operating system utilizes a large virtual address space 20 of 4 GB. Each application has its own user address space 22, which is limited to the lower 2 GB of the overall 4GB space. This lower 2 GB is accessible to both user-mode and kernel-mode threads. The upper 2 GB of the overall space forms a system address space 24. It accessible only to kernel-mode threads. Components of the operating system are located in system address space 24. Although the mapping of user address space 22 changes according to which user-mode process is currently executing, the mapping of system address space 24 remains constant.

Figure 2:
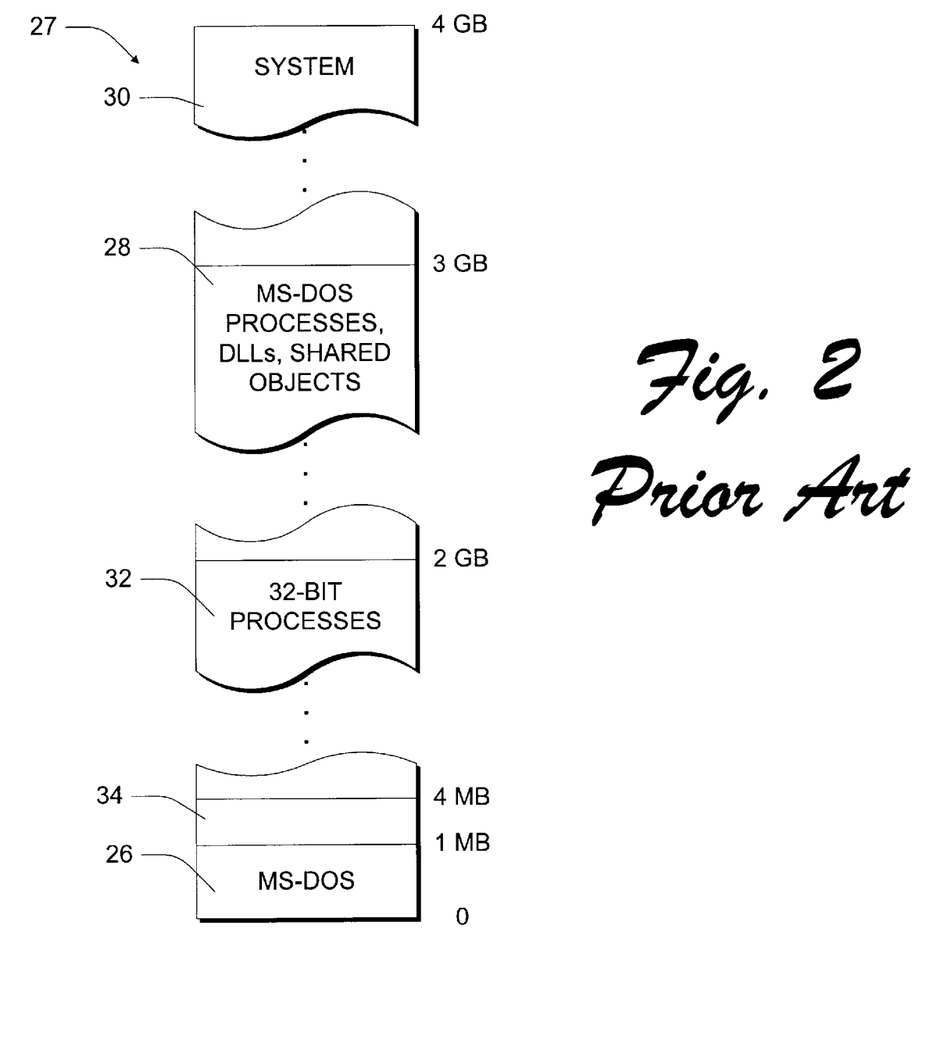

The Windows 95® operating system is described in *Inside Window* 95, by Adrian King, published by Microsoft Press, 1994. This book is also incorporated by reference. The Windows 95® operating system utilizes a slightly different memory arrangement, as shown in FIG. 2. The lowest 1 MB of the virtual address space, referenced by numeral 26, is used for the currently executing MS-DOS process. Each such process also has a valid memory map within the 2 GB to 3 GB region, referenced by numeral 28. When a particular process is active, its memory map in region 28 is identical to the memory map of region 26. This mapping allows the operating system to address the memory of any MS-DOS process (by accessing an address in the 2 GB to 3 GB virtual memory region), regardless of whether the MS-DOS process is active. Pointers supplied to the operating system by the MS-DOS process, which reference region 26, are translated by the operating system so that they refer to the corresponding location in the 2 GB to 3 GB range 28.

The upper GB 30 of virtual memory is reserved for privileged-mode system components. The 4 MB to 2 GB region 32 is used as private or user virtual address spaces for 32-bit Windows applications. This region is used similarly to the user region of FIG. 1. Accordingly, it is accessible from the system components that execute from the upper GB region 30. However, the system region 30 is not accessible from any user virtual address space 32.

While the techniques described above are effective in many situations, there are some disadvantages. One disadvantage, addressed by the invention described below, is that the practice of using different threads to execute kernel and system functions imposes significant processor and resource overhead. When switching to a different thread, that thread must either be pre-allocated or must be created on demand. Pre-allocating threads wastes memory, since a potentially large memory stack is associated with each thread. Creating threads on demand is more efficient from a memory standpoint, but wastes the processor time required to create the new thread and associated data structures.

Another disadvantage relates to using trap instructions for invoking system functions. While conventional high-level program compilers use a recognized format for function calls, this same format cannot be used for system function calls because of the requirement for issuing a trap instruction. Thus, a compiler must perform a call to a special library routine, implemented in assembly language, to issue a trap instruction. Special arguments must be pushed onto the memory stack (on top of function arguments) specifying which system function is desired.

SUMMARY OF THE INVENTION

The invention eliminates the need for changing execution threads when making system calls. This need is eliminated by using a virtual memory layout in which there is a 32 MB range of virtual addresses dedicated to every process. When active, each process is also mapped to a reserved 32 MB region at the bottom of the virtual memory space. Thus, every process (including user processes and system processes) executes from the lowest 32 MB of virtual memory. However, memory stacks are addressed using the upper, reserved 32 MB regions. Because the entire 4 GB address space is available to system processes, the execution thread and associated stack used to call a system function can also be used to execute a call handler within the kernel and to execute the called system function.

The invention also provides a more effective mechanism for making system calls, especially when using high-level language compilers such as C compilers. Rather than issuing a trap instruction, a calling thread makes a conventional function call. However, the call designates an invalid destination address. For example, all odd addresses are invalid when using certain microprocessors. In response to an invalid destination address, a memory fault handler is executed. The memory fault handler examines the invalid destination address and selects a system function based on the value of the address. It then calls the system function, using the same thread (and associated memory stack) that issued the call. Because the same memory stack is used, function arguments passed on the memory stack do not need to be copied or moved.

DETAILED DESCRIPTION OF THE PREFERRED EMBODIMENT

Figure 3:
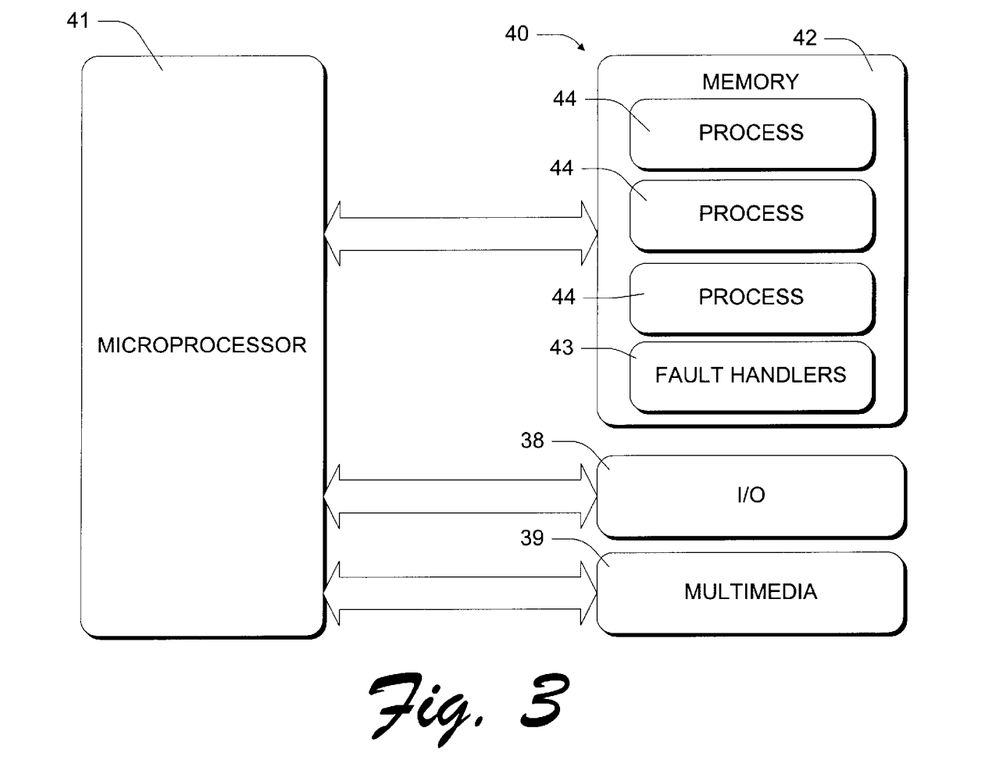
FIG. 3 is a block diagram of a computer system in accordance with one embodiment of the invention.

FIG. 3 shows pertinent hardware components of a computer system in accordance with a preferred embodiment of the invention, generally designated by reference numeral 40. Computer system 40 can be any one of a variety of different types of devices including consumer appliances such as set-top boxes, hand-held or pocket computers, Internet terminals, desktop computers, laptop or notebook computers, server computers, and CD/DVD game players.

Computer system 40 includes a microprocessor 41 and a computer-readable storage medium such as electronic memory 42. Although FIG. 3 shows only a single processor, the system might include a plurality of processors, used by a plurality of different processes or tasks, each having one or more execution threads. The terms task and process as used in this description refer to executing entities within a computer system having their own virtual address spaces. The term execution thread refers to a sequence or path of processor instructions that are executed using the same memory stack.

Computer system 40 also includes other typical computer hardware, such as I/O component 38, which includes interface electronics, as well as multimedia rendering devices 39 such as audio and video components.

Physical memory 42 preferably comprises randomly accessible read/write electronic memory (RAM). In a memory paging system, memory 42 might also include secondary storage such as a magnetic hard disk or other data recording media. Memory 42 might also include other types of computer-readable storage media on which executable components are distributed and stored, including floppy disks, CD-ROMs, and non-volatile electronic memory such as EPROMs. Computer-readable instructions are stored in memory 42 for performing the steps described herein.

Processor 41 is a conventional, off-the-shelf microprocessor such as a R3000 microprocessor, manufactured by MIPS Technologies of Mountain View, Calif. It has internal logic for implementing a virtual memory system. Other processors could also be used to implement the invention.

In accordance with conventional computer systems, computer system 40 includes an operating system and one or more programs or processes 44 that execute in conjunction with the operating system. Three such processes are shown in FIG. 3. Some of these processes are user processes and others are operating system processes. Processor 41 has privileged and non-privileged execution modes as explained above. User processes run in the non-privileged execution mode, and make calls to functions of system processes. Critical system components, such as those that manipulate virtual address spaces, execute in privileged mode. Other system processes, including many functions that are called by user processes, execute in the non-privileged mode.

The computer system includes one or more fault handlers 43. Fault handlers are privileged-mode system processes that execute from unmapped physical memory. Fault handlers 43 are initiated in response to interrupts and processor exceptions.

Figure 4:
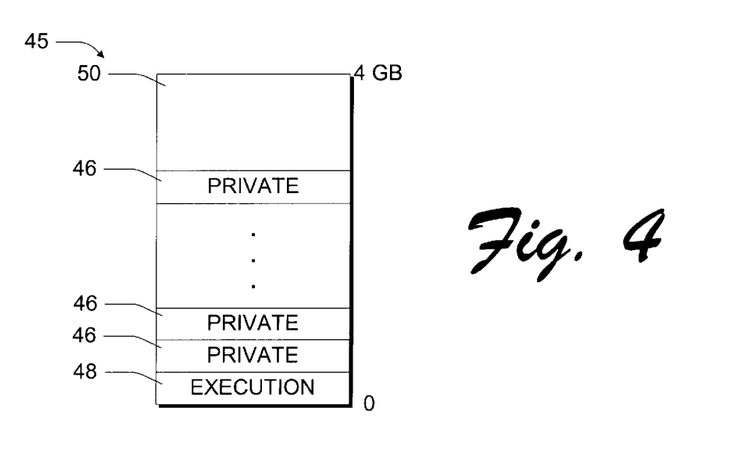
FIG. 4 shows a virtual memory system in accordance with the invention.

FIG. 4 shows a virtual memory system 45 that the operating system of computer system 40 implements. Virtual memory system 45 uses a single, integrated 4 GB virtual address space. All processes share this address space. Within the integrated 4 GB address space, the operating system defines 32 private virtual address spaces 46 (beginning at address 0x02000000) for different processes, respectively. In the described embodiment, each private address space 46 is 32 MB in size and is referred to as a "private slot." In addition, the operating system defines a 32 MB execution virtual address space or execution slot 48 at the very lowest portion of available virtual memory addresses (beginning at address 0).

Virtual memory above the private slots, referenced by numeral 50, is used for mapping very large objects. For instance, it is possible to map a file into an application's virtual address space. Since many files might exceed 32 MB, processes are allowed to map such files in the upper virtual memory regions.

Fault handlers are located in unmapped physical memory, and do not appear in virtual memory.

Each process, whether it is a user process or a system process, is assigned to a specific one of private address spaces 46. Slot 48, the bottommost 32 MB, is special. What appears in this slot is the address space of the currently running process. Thus, each process is configured for execution by processor 41 for execution only from execution address space 48. When a process is ready for execution, execution address space 48 is configured so that it maps to the same physical memory as the process' private address space 46. The process's address space is actually visible to the process's threads via two different virtual memory addresses: the private slot of the process and the single execution slot.

Figure 5:
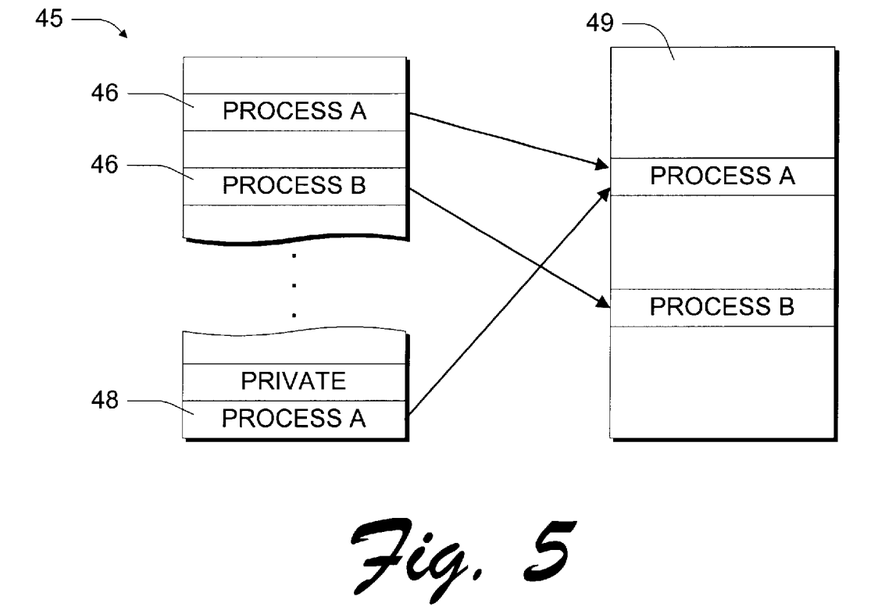
FIGS. 5 and 6 show mappings of virtual memory to physical memory during execution of two different processes.
Figure 6:
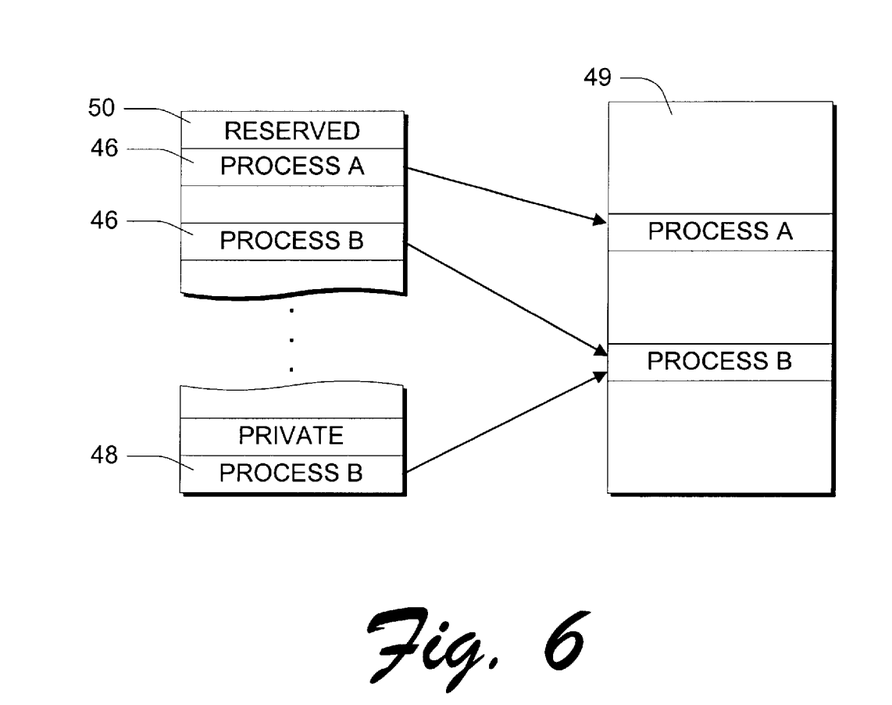

The correspondence of the execution address space to the private address space of a currently executing process is illustrated by FIGS. 5 and 6. FIG. 5 shows generalized mappings relating to processes A and B, during execution of process A. The private address space of process A and execution address space 48 both map to process A in physical memory 49. FIG. 6 shows generalized mappings relating to processes A and B during execution of process B. In this case, the mapping of execution address space 48 has been changed to reference process B in physical memory 49.

The operating system does not allow one application to corrupt another. It protects processes by altering page protections. When a thread in a process is active, all pages belonging to all other processes are protected. An executing thread can touch addresses in the execution address space in the private address space of its process, but an attempt to touch an address in any other slot causes an access violation to occur.

System processes, however, are allowed to access the private virtual address spaces of calling user processes. Specifically, a calling process's private address space is left unprotected when a system function is initiated from the calling process.

Figure 7:
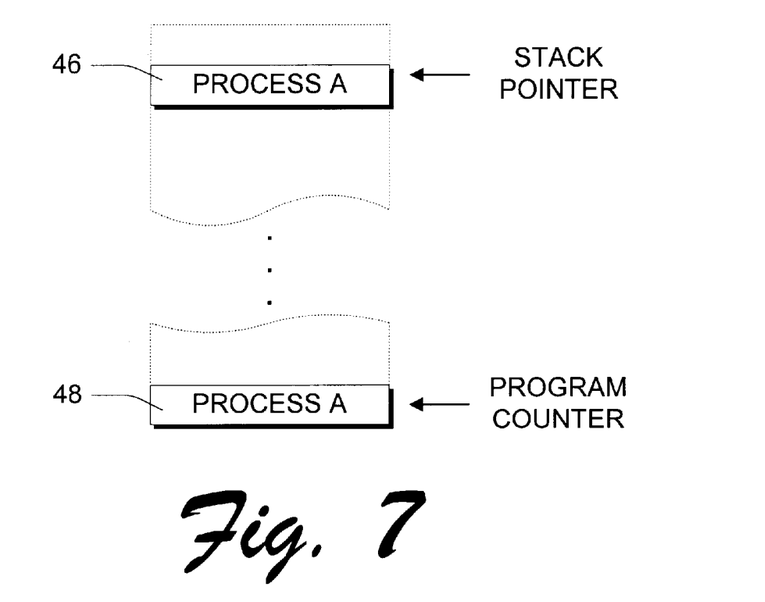
FIGS. 7 and 8 show user and system address spaces, respectively.

As an example, suppose that process A is a user process and process B is a system process that needs relatively higher privileges with regard to memory access. FIG. 7 shows the virtual address space used by processor 41 when executing a user process such as process A. Process A executes from execution memory space 48 and thus has access to that portion of virtual memory. It also has access to its private address space 46, which is a duplicate of the execution address space 48 during periods when process A is executing. The virtual address space of a user process thus includes its private virtual address space as well as execution address space 48.

Figure 8:
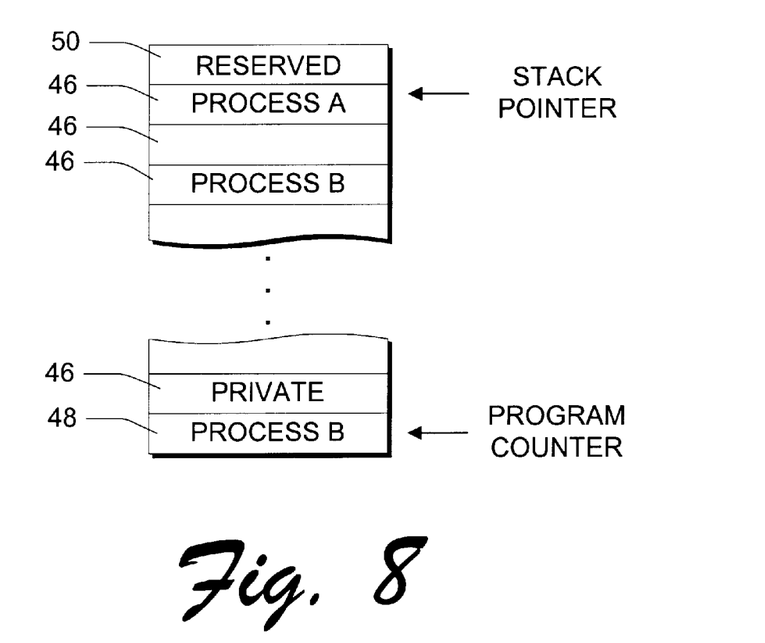

FIG. 8 shows the virtual address space of system process B. Process B executes from execution virtual memory 48 and thus has access to that portion of virtual memory. In addition, it has access to all of the private virtual address spaces 46, and to the reserved address space 50. The address space of a system process thus includes the entire 4 GB address range.

An execution thread in process A executes in execution address space 48. Thus, the processor's program counter points to an address within execution address space 48 as shown in FIG. 7. In accordance with the invention, however, the execution thread uses a memory stack that is located in the private memory space 46 of process A. That is, the thread's stack pointer (shown in FIG. 7) points to virtual memory addresses within the private address space 46 of process A rather than to virtual memory addresses within execution address space 48.

Now suppose that process A has an execution thread that calls a system function that is part of system process B. This involves a change of address spaces, from that shown in FIG. 7 to that shown in FIG. 8. When the call is made to the system function, the operating system is configured to use the same execution thread—the execution thread of process A—for executing the system function in process B from the execution address space. The memory stack and the stack pointer remain located in the private address space of process A. This is possible because the system function has access to the private address space of the calling process, in this case process A. Thus, it is possible to use the calling process' execution thread and memory stack during a call to a system function and throughout the execution of the system function.

As discussed above, making a call from a user process to a system process is not as simple as simply executing a "call" or "jump" instruction. This is because system processes are located at virtual memory addresses that are not available to user processes. Before system code can be executed, the processor much switch to privileged mode in order to change virtual memory mappings.

In accordance with the invention, system calls and other inter-process calls are made by executing a jump instruction that specifies an invalid address as the destination address. In response to memory faults, the microprocessor invokes an operating system component referred to as a call handler. The call handler has a non-preemptible portion, referred to as a memory fault handler, that takes care of critical functions such as changing virtual memory mappings. It also has a preemptible portion, referred to as a call processing function, that performs less critical tasks as described below. These privileged-mode components reside in unmapped memory, so that they are available regardless of which address space is currently active.

In response to a memory fault, the invalid destination address is provided to the memory fault handler in a specified processor register. The memory fault handler examines the invalid address. If the address is an odd address, the memory fault handler recognizes that a call to a system function has been attempted. It then executes a call processing function, which uses the invalid address as an index into tables of available system functions, and calls or otherwise invokes the indexed function.

Figure 9:
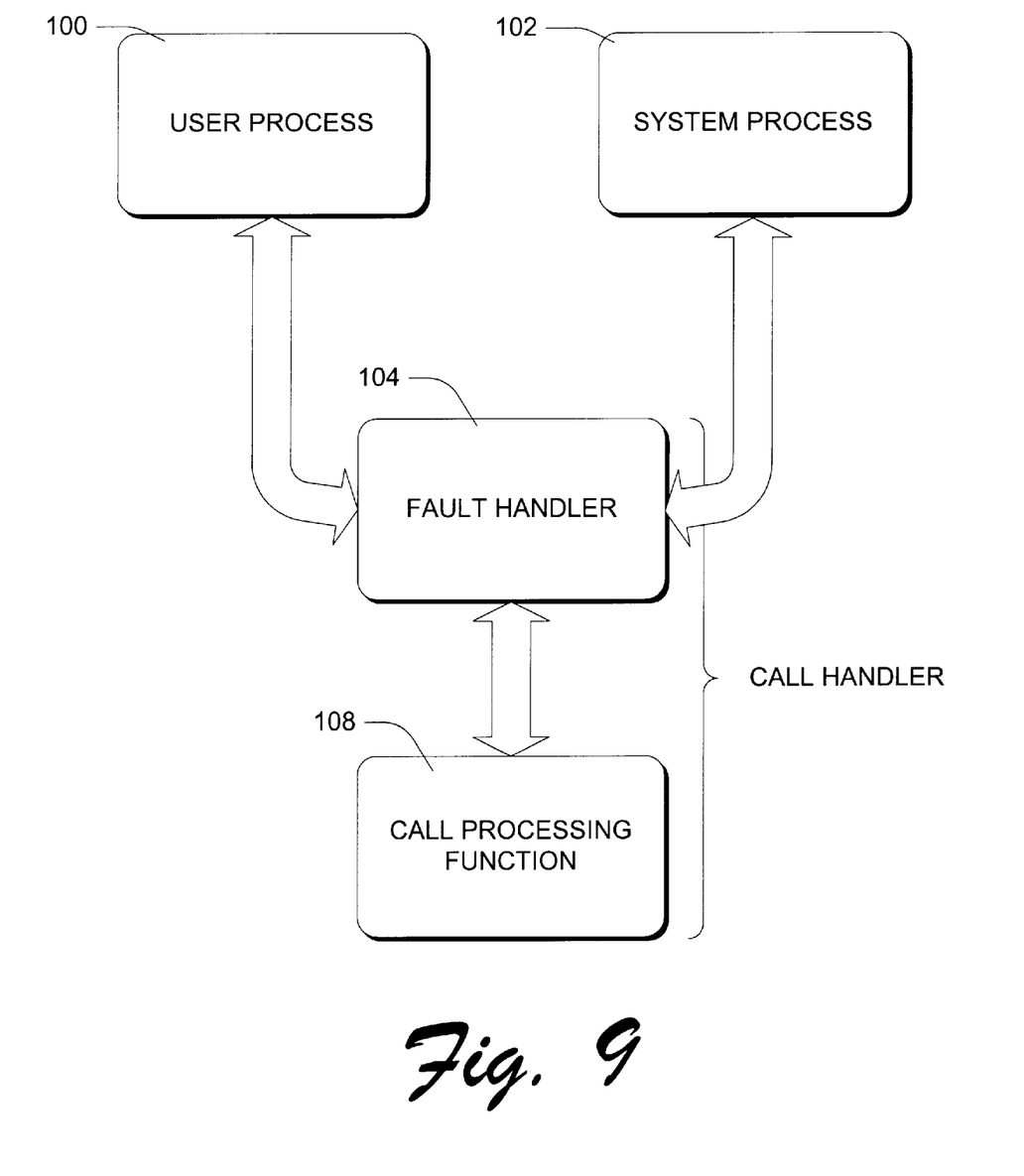
FIG. 9 shows software components involved in practicing the invention.

FIG. 9 shows the various software components involved in making a system call. Such components include a user process 100 that executes in a user virtual address space as shown in FIG. 7. A system process 102 executes in a system virtual address space as shown in FIG. 8. Calling a function of system process 102 from user process 100 requires changing address spaces from the user address space to the system address space.

A memory fault handler 104 executes from unmapped memory. Fault handler 104 is non-preemptible, so that it can perform system critical operations such as changing virtual address mappings. Memory fault handler 104 responds to all types of memory faults. If a memory fault is generated as a result of attempting to make a system call, fault handler 104 invokes a call processing function 108.

Initially, user process 100 executes in its user address space. It has at least one associated execution thread that the operating system creates for executing functions of the first process. User process 100 also has a memory stack that is used by the execution thread in a conventional manner. As described above, the program counter for the execution thread points to virtual memory addresses in execution address space 48 (FIG. 7). However, the stack pointer references locations in the private virtual address space 46 of the executing user process. While the user process is executing, both of these virtual address spaces are mapped to the same physical memory.

At some point within the execution thread, it is desired to call a particular system function, wherein the system function is to be performed by system process 102. To accomplish this, the executing thread of user process 100 performs a step of executing a jump instruction, with a destination address that is calculated to generate a memory fault. Specifically, the specified destination address is invalid within the operating environment and virtual memory space of the executing user process. Furthermore, the invalid address falls within a predefined category of invalid addresses that are guaranteed to always be invalid, and are designated to be used only for system calls.

In the described embodiment that uses a MIPS microprocessor, the invalid address is simply an odd address. In this embodiment of the invention, odd addresses are recognized as a category of addresses that are only used when making system calls. In other environments, different types of invalid addresses might be used. When using some processors, for instance, all memory addresses are required to be word-aligned; references to non-word-aligned addresses generate memory faults. With other processors, it might be desirable to reserve a block of virtual memory addresses that are always maintained as invalid. Calls or jumps to these addresses are interpreted as system calls.

The jump instruction is generally any processor instruction that causes the program pointer to change to a specified destination address other than the address of the naturally following program instruction. For instance, the jump instruction might be a "call" instruction on many microprocessors. When using a high-level language compiler such as a C compiler, the jump instruction is the result of a normal function call. Code generated by the compiler pushes function arguments onto the memory stack and/or to processor registers, and then issues a call instruction. In the described embodiment, a system call is the same as making a call within a single process.

In the compiler, a system call invokes one or more macros that are configured to determine the destination address corresponding to a particular system function. As an example, a "MoveFileW" system function is defined in a compiler header as follows:

define MoveFileW WIN32_FS_CALL(BOOL, 4,
   (LPCWSTR lpExistingFileName, LPCWSTR
   lpNewFileName))

This means that MoveFileW is a "win32 file system call" (WIN32_FS_CALL), which returns type BOOL, is at index 4 in a function table, and takes two parameters both of type LPCWSTR.

"WIN32_FS_CALL" is defined as
   #define WIN32_FS_CALL(type, api, args) (*(type(*)
      args)IMPLICIT_CALL(SH_FILESYS_APIS,
      api))
   #define SH_FILESYS_APIS 20 //index into table of
      processes
   #define IMPLICIT_CALL(hid, mid) (FIRST_
      METHOD-(hid)<<HANDLE_SHIFT|(mid))
      *APICALL_SCALE)
   #define FIRST_METHOD 0xFFFFFE01 //address of
      FIRST_METHOD
   #define HANDLE_SHIFT 8
   #define APICALL_SCALE 2

The result of these macros is a negative number crafted out of two indexes: a function index and a process index.

The function is invoked as normal;
   if(MoveFileW(pOldName,pNewName))
      OutputDebugString("Rename succeeded!");

This generates an assembly code jump to the odd address corresponding to system function "MoveFileW".

In response to a memory fault, the processor automatically changes to the privileged execution mode and invokes memory fault handler 104. The invalid destination address is passed to the fault handler in a processor register. The fault handler examines the destination address to determine if it is an address designated to invoke a system function. In the preferred embodiment, any odd address is recognized as one that is intended to be a system call. If the address is not an odd address, but is invalid for some other reason, normal fault handling procedures are carried out.

If the invalid address is an odd address, values in any registers that are used for passing function arguments are pushed onto the current stack (which is the stack that was used by the calling thread). If arguments are passed on the stack, they are simply left there. The location of function arguments is typically dependent on the particular microprocessor being used. Some microprocessors use both registers and the stack to pass arguments, while other microprocessors use only the stack.

No thread changes are made during execution of the fault handler—the thread that made the system call continues to execute with the same stack that was used by the calling process.

The fault handler then invokes call processing function 108. In contrast to the fault handler, the call processing function is preemptible. The call processing function performs a step of identifying or selecting a particular system function from a plurality of system functions, as a function of the specified invalid destination address. More specifically, the call processing process refers to a two-level table structure. Part of the specified destination address is used to index a first table that identifies a particular system process. From this table, the call processing function obtains an identifier for the system function that is being called. The remaining part of the destination address is then used to index a second table that identifies a particular function within the system process. From this table, the call processing function obtains a valid destination address for invoking the targeted system function.

The call processing function also processes pointer arguments so that they are valid from the system address space. This is needed because any arguments passed by the calling user process will reference addresses within execution address space 48. However, once the system function is executing the user process will no longer occupy the execution address space. Because of this, the system function must access the user process' memory at its private address space 46 (which is accessible by all system functions). Thus, the call processing function determines which of the arguments are pointers, and translates them for use in the address space of the system function. This translation is normally an addition operation.

Note that in some cases, such as in nested system calls, no translation is necessary. For example, if a user process calls a first system process with pointer arguments, the pointer arguments are translated. If the first system process then passes the pointer arguments to another system process, there is no need to perform the translation again.

To determine which arguments are pointers, the system function refers to a call signature table. This table is provided and configured to identify which arguments are pointers for each different system function. The call processing function then reads those arguments from the stack, adds an offset equal to the base location of the calling process' private address space, and writes them back to the stack. The system function can then use the arguments to directly access referenced locations in the calling process' memory.

Control is then returned to fault handler 104. The actual address of the system function is returned either on the stack or on a register, along with an identifier of the process to which the system function belongs. Fault handler 104 switches to the system address space of the specified system function, restores the previous execution mode (normally non-privileged mode) and calls the system function. Specifically, execution address space 48 is remapped so that it references the physical memory of the system process whose function is to be executed. A jump or call instruction is then executed, specifying, as its destination, the address of the system function itself.

The same execution thread is used for all of these functions. The execution thread is created for execution in the user process. The fault handler, the call processing function, and the system function itself are executed with the same execution thread.

Returning from a system function to the calling process is accomplished in much the same way as the system call itself. When invoking the system function, fault handler 104 actually specifies a predefined return address that is an invalid, odd address. When the system function returns, it executes a jump instruction to this address, thus generating another memory fault. The memory fault handler executes in response to the memory fault. The memory fault handler recognizes the invalid destination address as a "return" instruction and invokes the call processing function. Control is returned to the fault handler which changes the virtual memory system back to the address space of the user process and executes a call to the user process.

Figure 10:
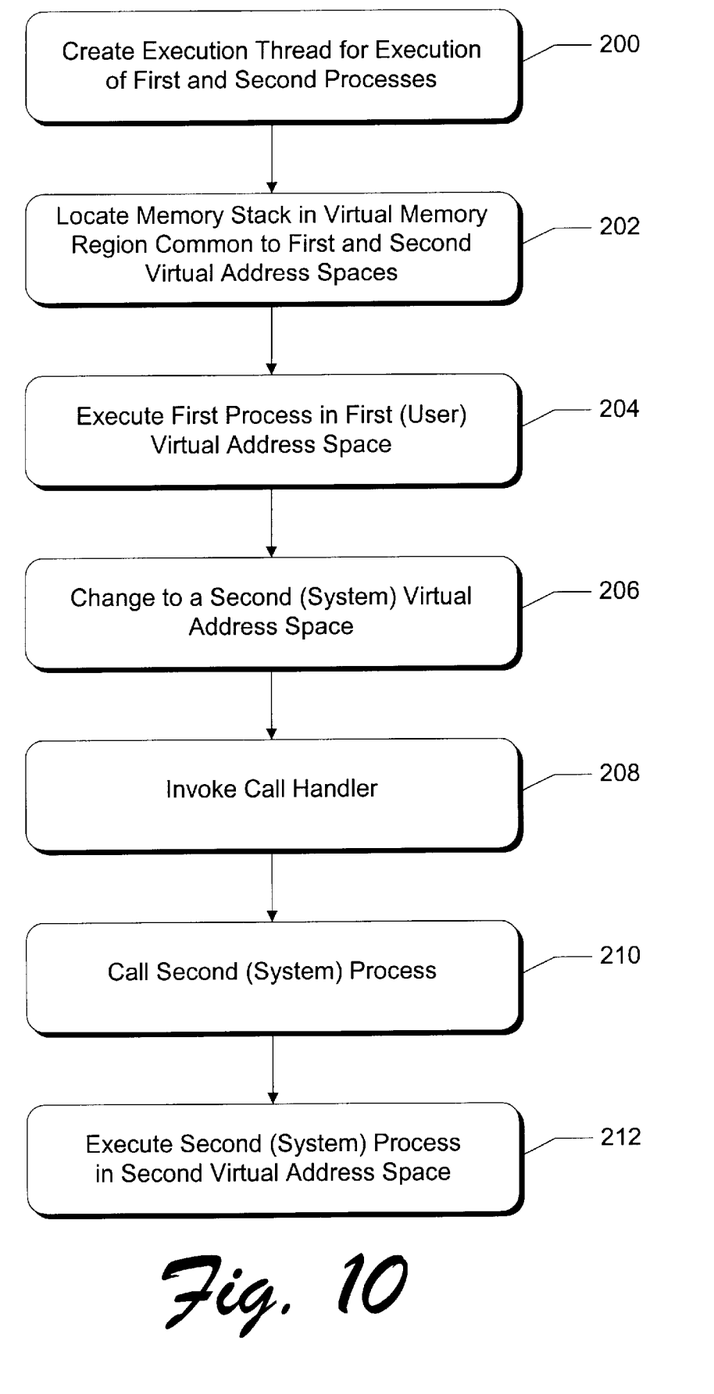
FIG. 10 is a flowchart showing methodological steps in accordance with an embodiment of the invention.

In order to keep track of return paths to calling functions, the call processing function maintains a linked list. The general structure of this list in the described embodiment of the invention is as follows:

typedef struct CALLSTACK{
        struct CALLSTACK *pcstkNext; //pointer to the next CALLSTACK, since calls can be nested
        RETADDR retAddr; //return address back to the caller
        HANDLE hprocLast //handle of previous process if non-kernel call or previous mode of thread (kernel/user) if kernel call-handles are always greater than 0x10000, while thread mode is 0 or 1
        ACCESSKEY akyLast; //a key indicating which private slots were available to the calling process
    } CALLSTACK FIG. 10 shows pertinent methodological steps that implement a method in accordance with the invention for calling one process from another process, wherein the processes execute in different address spaces. A step 200 comprises creating a given execution thread for execution of a first process and a second process. A step 202 comprises locating a memory stack in a virtual memory region that is common to the first and second virtual address spaces. A step 204 comprises executing the first process in a first or user virtual address space with said given execution thread, using the memory stack located in step 202. Steps 206, 208, and 210 comprise calling the second process from the first process. Step 206 comprises changing to a second or system virtual address space. Step 208 comprises invoking a call handler that performs a further step 210, with the given execution thread, of calling the second process. Step 212 comprises executing the second process in the second virtual address space with said given execution thread, using the memory stack located in step 202. In the embodiment described herein, step 206 is accomplished by executing a jump instruction to an odd or invalid destination address.

The invention has several advantages over the prior art. One advantage is that resources are conserved by using existing threads rather than creating new ones for system calls. Specifically, stack memory and context storage memory are saved by using existing threads. This can amount to several Kb per thread due to page constraints. Using the same stack also eliminates the need for copying arguments. Furthermore, the particular architecture described above allows data to be referenced by pointer, eliminating the need to copy data from one address space to another.

Another advantage is that system calls can be made much more simply than in the prior art. In the prior art, a system call generally required a special function library. A system call would invoke a special code that would take special steps to issue a trap instruction. To specify a particular system function, special arguments (in addition to the function arguments) were passed in registers or on a memory stack.

In accordance with the invention, however, these special steps are not necessary. A call is made just as if it were a call to a function within the same process, with the specification of a predefined destination address. Thus, the process of making a system call from a user process is simplified and the processing of the call in the operating system is also simplified.

In compliance with the statute, the invention has been described in language more or less specific as to structural and methodical features. It is to be understood, however, that the invention is not limited to the specific features described, since the means herein disclosed comprise preferred forms of putting the invention into effect. The invention is therefore claimed in any of its forms or modifications within the proper scope of the appended claims appropriately interpreted in accordance with the doctrine of equivalents.

What is claimed is:

1. A method of making a call from one process to another, comprising the following steps:
   executing a jump instruction from a first process;
   in the jump instruction, specifying a destination address that generates a first memory fault, wherein the destination address identifies a second process;
   executing a call handler in response to the first memory fault;
   calling the second process from the call handler in response to the first memory fault.

2. A method as recited in claim 1, and further comprising a step of changing to a privileged execution mode in response to the first memory fault.

3. A method as recited in claim 1, and further comprising a step of changing address spaces before calling the second process.

4. A method as recited in claim 1, and further comprising a step of selecting the second process from a plurality of available processes as a function of the specified destination address.

5. A computer-readable storage medium containing computer-executable instructions for performing steps as recited in claim 1.

6. A method as recited in claim 1, wherein the specifying step comprises specifying an odd address as the destination address.

7. A method as recited in claim 1, wherein the specifying step comprises specifying an invalid address as the destination address.

8. A method as recited in claim 1, wherein the specifying step comprises specifying a non-word-aligned address as the destination address.

9. A method as recited in claim 1, wherein a given execution thread executes the first process, further comprising a step of executing the second process with said given execution thread.

10. A method as recited in claim 1, wherein a given execution thread executes the first process, further comprising a step of executing the call handler and the second process with said given execution thread.

11. A method as recited in claim 1, wherein a given execution thread executes the first process, further comprising a step of executing the call handler with said given execution thread.

12. A method as recited in claim 1, wherein the first process is executed by a given execution thread that uses a particular memory stack, further comprising a step of continuing to use said particular memory stack when executing the second process.

13. A method as recited in claim 1, wherein the first process is executed by a given execution thread that uses a particular memory stack, further comprising a step of continuing to use said particular memory stack when executing the call handler.

14. A method as recited in claim 1, wherein the first process is executed by a given execution thread that uses a particular memory stack, further comprising a step of continuing to use said particular memory stack when executing the call handler and the second process.

15. A method as recited in claim 1, wherein the call handler includes preemptible and non-preemptible portions.

16. A method as recited in claim 1, wherein the first process executes in a first virtual address space and provides arguments to the second process, the second process executing in a second virtual address space, further comprising the following additional steps:
   determining which of the arguments are pointers;
   translating the pointers for use in the second virtual address space.

17. A method as recited in claim 1, wherein a given execution thread executes the first process, the method further comprising the following additional steps:
   executing a jump instruction from the second process to a predefined destination address that generates a second memory fault;
   executing the call handler in response to the second memory fault;
   returning to the first process from the call handler in response to the second memory fault.

18. A computer-readable storage medium containing computer-executable instructions for performing steps as recited in claim 17.

19. A method as recited in claim 17, wherein the predefined destination address is an odd address.

20. A method as recited in claim 17, further comprising a step of executing the call handler and the second process with said given execution thread.

21. A computer-readable storage medium containing computer-executable instructions for making a system call to a system function, said instructions being executable to perform steps comprising:
   executing a jump instruction;
   in the jump instruction, specifying an invalid destination address to generate a memory fault;
   wherein the invalid destination address identifies a particular system function from a plurality of system functions;
   calling the system function identified by the invalid destination address.

22. A computer-readable storage medium as recited in claim 21, containing further instructions for performing additional steps comprising:
   executing a call handler in response to the memory fault;
   wherein the call handler performs the step of calling the system function identified by the invalid destination address.

23. A computer-readable storage medium as recited in claim 21, wherein the invalid destination address is an odd address.

24. A computer-readable storage medium as recited in claim 21, wherein the invalid destination address a non-word-aligned address.

25. A computer-readable storage medium as recited in claim 22, wherein the system call is associated with arguments from a calling process that executes in a first virtual address space, the system function executing from a second virtual address space, the computer-readable storage medium containing further instructions for performing additional steps comprising:

determining which of the arguments are pointers;

translating the pointers for use in the second virtual address space.

26. A computer-readable storage medium as recited in claim 22, wherein the system call to the system function is made by an execution thread of a calling process, wherein the calling process uses a particular memory stack, the computer-readable storage medium containing further instructions for performing an additional step of executing the system function with the execution thread and memory stack of the calling process.

27. A computer-readable storage medium as recited in claim 22, wherein the system call to the system function is made by an execution thread of a calling process, wherein the calling process uses a particular memory stack, the computer-readable storage medium containing further instructions for performing an additional step of executing the call handler with the execution thread and memory stack of the calling process.

28. A computer-readable storage medium as recited in claim 22, wherein the system call to the system function is made by an execution thread of a calling process, wherein the calling process uses a particular memory stack, the computer-readable storage medium containing further instructions for performing an additional step of executing the call handler and the system function with the execution thread and memory stack of the calling process.

29. A method of calling a system process from a user process comprising the following steps:

executing the user process in a user virtual address space with an associated execution thread and memory stack;

executing a jump instruction from the user process to an invalid destination address that generates a first memory fault;

associating arguments with the jump instruction;

changing to a privileged execution mode and executing a call handler in response to the first memory fault;

identifying a system function as a function of the invalid destination address;

switching to a system virtual address space;

calling the identified system function from the call handler;

using the execution thread and memory stack of the user process to execute the call handler and the system function.

30. A computer-readable storage medium containing computer-executable instructions for performing steps as recited in claim 29.

31. A method as recited in claim 29, wherein the invalid destination address comprises an odd address.

32. A method as recited in claim 29, wherein the invalid destination address comprises a non-word-aligned address.

33. A method as recited in claim 29, wherein the call handler includes preemptible and non-preemptible portions.

34. A method as recited in claim 29, further comprising the following additional steps:

determining which of the arguments are pointers;

translating the pointers for use in the system virtual address space.

35. A method as recited in claim 29, further comprising the following additional steps:

executing a jump instruction from the system function to a predefined destination address that generates a second memory fault;

executing the call handler in response to the second memory fault;

switching back to the user virtual address space;

returning to the calling process from the call handler in response to the second memory fault.

36. A computer system comprising:

an operating system that defines private virtual address spaces for a plurality of different processes, respectively, the operating system further defining an execution virtual address space that corresponds to each process' private virtual address space when that process is executing;

first and second processes configured for execution by the processor in the execution virtual address space;

the first process having a particular execution thread that executes in the execution address space, said particular execution thread using a given memory stack that is located in the private virtual address space of the first process, said particular execution thread calling a function in the second process;

wherein the operating system is configured to use said particular execution thread and the given memory stack for executing said function in the second process from the execution virtual address space, wherein said given memory stack remains located in the private virtual address space of the first process.

37. A computer system as recited in claim 36, wherein the operating system has a call handler that calls said function in the second process, wherein the operating system is configured to use said particular execution thread and said given memory stack for executing the call handler.

38. A computer system as recited in claim 36, wherein said particular execution thread calls said function in the second process by executing a jump instruction to an invalid destination address.

39. A method of calling a system process from a user process comprising:

executing the user process in a user virtual address space with a given execution thread, the given execution thread using a thread memory stack;

calling a system function from the user process;

executing the system function with said given execution thread using said thread memory stack.

40. A method as recited in claim 39, further comprising locating the thread memory stack in a virtual memory region that is common to the user process and the system process.

41. A method as recited in claim 39, wherein calling the system function comprises invoking a call handler that in turn invokes the system function, the method further comprising executing the system call handler with said given execution thread using said thread memory stack.

42. A method as recited in claim 39, wherein calling the system function comprises executing a jump instruction to an invalid destination address.

43. A method as recited in claim 39, wherein calling the system function comprises executing a jump instruction to an odd destination address.

44. A computer-readable storage medium containing computer-executable instructions for performing the method of claim 39.

45. A method of calling one process from another process wherein the processes execute in different virtual address spaces, comprising the following steps:

creating a given execution thread for execution of a first process, the given execution thread being associated with a thread memory stack;

executing the first process in a first virtual address space with said given execution thread using said thread memory stack;

calling a second process from the first process;

executing the second process in a second virtual address space with said given execution thread using said thread memory stack.

46. A method as recited in claim 45, further comprising locating the thread memory stack in a virtual memory region that is common to the first and second virtual address spaces.

47. A method as recited in claim 45, wherein calling the second process comprises executing a jump instruction to an odd destination address.

48. A computer-readable storage medium containing computer-executable instructions for performing the method recited in claim 45.

49. A method as recited in claim 45, wherein calling the second process comprises invoking a call handler that in turn invokes the second process, the method comprising executing the call handler with said given execution thread using said thread memory stack.

50. A method as recited in claim 45, wherein calling the second process comprises executing a jump instruction to an invalid destination address.

51. A computer-readable storage medium containing computer-executable instructions for calling a system process from a user process, said instructions being executable to perform acts comprising:

creating a given execution thread for execution of the user process, wherein the given execution thread is associated with a thread memory stack;

executing the user process in a user virtual address space with said given execution thread using said thread memory stack;

calling a system process from the user process;

changing to a system virtual address space; and executing the system process in the system virtual address space with said given execution thread using said thread memory stack.

52. A computer-readable storage medium as recited in claim 51, the method further comprising locating the thread memory stack in a virtual memory region that is common to the user and system virtual address spaces.

53. A computer-readable storage medium as recited in claim 51, wherein calling the system process comprises invoking a call handler that in turn invokes the system process, the method comprising the further step of executing the call handler with said given execution thread using the thread memory stack.

54. A computer-readable storage medium as recited in claim 51, wherein calling the system process comprises executing a jump instruction to an invalid destination address.

55. A computer-readable storage medium as recited in claim 51, wherein the calling step comprises executing a jump instruction to an odd destination address.

56. A computer system comprising:

a virtual memory system that defines a first virtual address space and a second virtual address space;

first and second processes configured for execution by the processor in the first and second virtual address spaces, respectively;

wherein the first process is configured to call the second process by executing a jump instruction to a destination address that is invalid;

wherein the invalid destination address identifies the second process from among a plurality of available processes;

a call handler that is invoked in response to the invalid destination address, wherein the call handler invokes the second process identified by the invalid destination address.

57. A computer system as recited in claim 56, wherein the invalid destination address is an odd address.

58. A computer system as recited in claim 56, wherein the invalid destination address is a non-word-aligned address.

59. A computer system as recited in claim 56, further comprising an execution thread that calls the second process and that executes the call handler and the second process.

60. A computer system as recited in claim 56, wherein the call handler selects the second process from among a plurality of available system processes as a function of the invalid destination address.

61. A computer system as recited in claim 56, further comprising an execution thread that executes the call handler and that calls the second process, from the call handler.

62. A computer system as recited in claim 56, further comprising an execution thread that executes the call handler and the second process the second process.

* * * * *